United States Patent [19]
Hunsberger et al.

[11] Patent Number: 5,368,068
[45] Date of Patent: Nov. 29, 1994

[54] RELIEF VALVE FOR THE FUEL PUMP OF AN OIL BURNER

[75] Inventors: Dale L. Hunsberger; Frank L. Harwath, both of Rockford, Ill.

[73] Assignee: Suntec Industries Incorporated, Rockford, Ill.

[21] Appl. No.: 188,781

[22] Filed: Jan. 31, 1994

[51] Int. Cl.5 ............................................. F16K 17/18
[52] U.S. Cl. ................................. 137/493.7; 137/539; 239/126; 239/571
[58] Field of Search ................ 137/493.7, 539; 239/126, 571

[56] References Cited

U.S. PATENT DOCUMENTS

| | | | |
|---|---|---|---|
| 1,583,834 | 5/1926 | Humphrey | 137/493.7 |
| 3,547,093 | 12/1970 | Sherman | 239/126 |
| 3,566,901 | 3/1971 | Swedberg | 137/87 |
| 3,910,305 | 10/1975 | Hughes | 137/539 X |

OTHER PUBLICATIONS

Sketch bearing the date stamp "Michael C. Payden Oct. -8, 1993".

*Primary Examiner*—Robert G. Nilson
*Attorney, Agent, or Firm*—Leydig, Voit & Mayer

[57] ABSTRACT

A relief valve is built into the nozzle port of a fuel pump for an oil burner and opens to relieve pressure in the fuel supply line and prevent oil from dripping out of the burner nozzle when the pump is shut down. The relief valve comprises a ball which is normally held in a closed position by an arcuate leaf spring wrapped partially around the nozzle port.

6 Claims, 2 Drawing Sheets

RELIEF VALVE FOR THE FUEL PUMP OF AN OIL BURNER

BACKGROUND OF THE INVENTION

This invention relates generally to a valve for controlling fuel oil supplied from a fuel pump to the nozzle of an oil burner.

A system of the type in which the present valve is particularly adapted for use is disclosed in Swedberg U.S. Pat. No. 3,566,901. In such a system, a pump delivers pressurized fuel to a chamber having a nozzle port which communicates by way of a supply line with the nozzle of the burner. A regulating valve disposed in the chamber normally closes the nozzle port but opens automatically shortly after start-up of the pump so as to enable pressurized fuel to be supplied to the nozzle. When the pump shuts down, the regulating valve is restored to its closed position.

A check valve is located closely adjacent the burner nozzle and cuts off flow from the supply line to the nozzle when the regulating valve closes. As a result of the check valve, fuel oil is trapped in the supply line and is prevented from dripping out of and building up on the nozzle and the burner.

When the regulating valve and the check valve are both closed, heat created either by the burner itself or by an electric preheater for the fuel supply line can cause a build up of pressure of the oil trapped in the supply line. If the pressure overcomes the check valve, fuel oil can undesirably drip out of the nozzle.

To prevent such dripping, certain prior systems have included a relief valve which opens and relieves the pressure in the supply line before such pressure can build up to a magnitude sufficient to open the check valve. The relief valves of prior systems are relatively complex and occupy significant space.

SUMMARY OF THE INVENTION

The general aim of the present invention is to provide a fuel system of the above type with a new and improved relief valve which is comparatively simple in construction and which fits compactly within the chamber of the nozzle port.

A more detailed object of the invention is to achieve the foregoing through the provision of a relief valve which is built into the nozzle port in such a manner as to require virtually no increase in the size of the nozzle port or the surrounding chamber.

The invention also resides in the unique provision of a leaf spring which wraps partially around the nozzle port and which serves to bias the relief valve to its closed position.

These and other objects and advantages of the invention will become more apparent from the following detailed description when taken in conjunction with the accompanying drawings.

Figure 1:
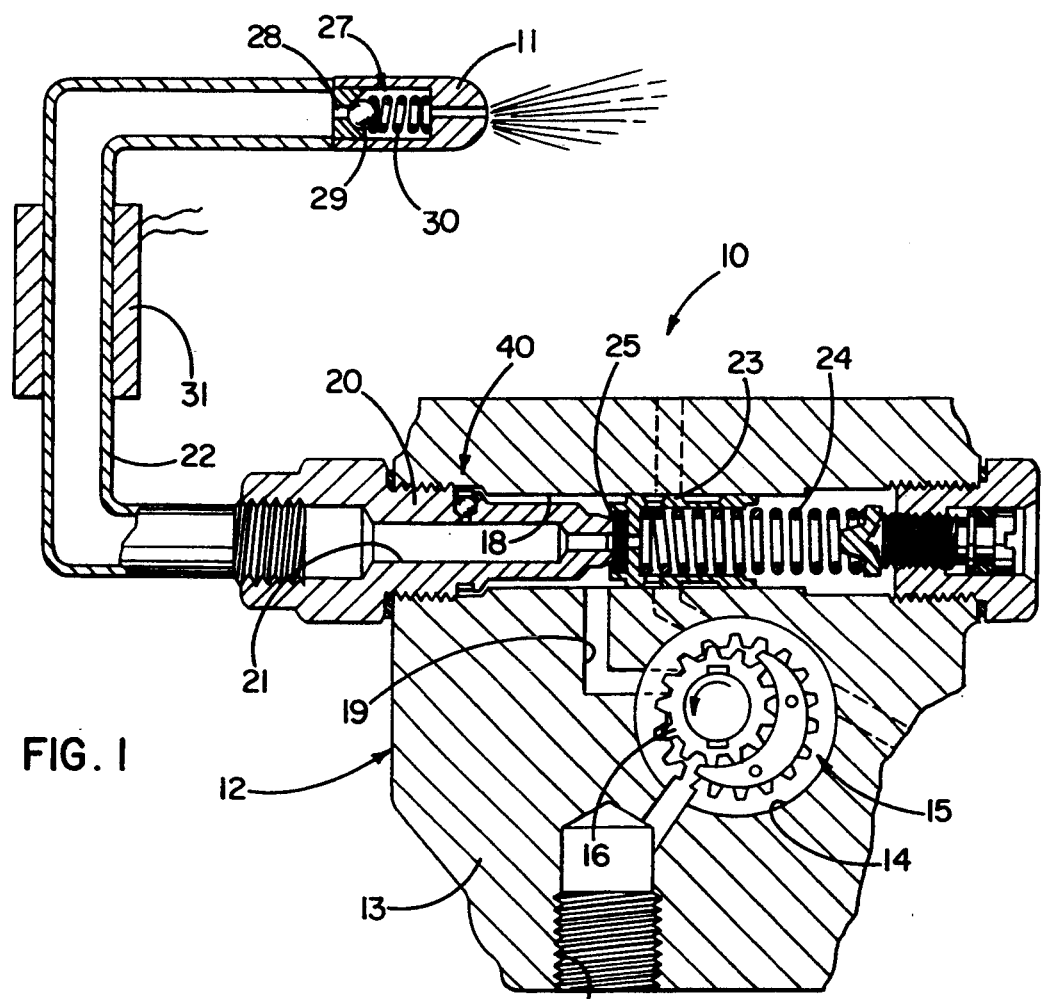
FIG. 1 is a schematic view of a fuel delivery system equipped with a new and improved relief valve incorporating the unique features of the present invention.
Figure 2:
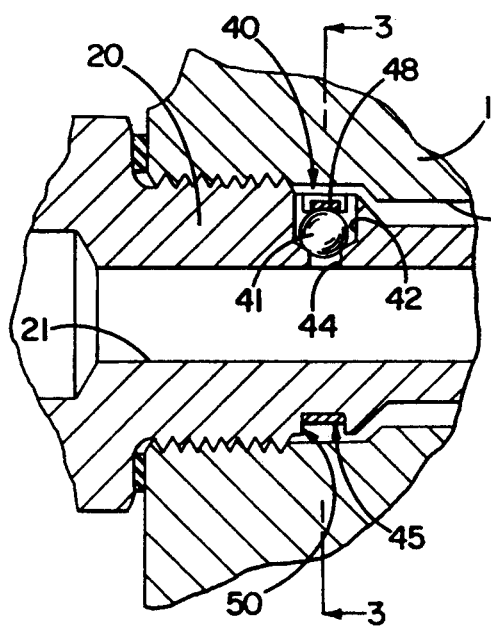
FIG. 2 is an enlarged view of certain components shown in FIG. 1.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings in connection with a system 10 for supplying fuel oil to the nozzle 11 of an oil burner. The heart of the system is a pump 12 having a body member 13 with a cavity 14 which houses a gear set 15 including a motor-driven spur gear 16. When the gear 16 is rotated, fuel oil in a tank (not shown) is sucked into the cavity 14 via an inlet 17 and is delivered under pressure to a chamber 18 formed in the body 13. For purposes of simplicity, the chamber 18 has been shown as communicating directly with the cavity 14 by means of a passage 19 but it should be appreciated that in actual practice the overall pump 12 may assimilate that disclosed in Swedberg U.S. Pat. No. 3,566,901.

Threaded into the pump body 13 is another body or fitting 20 which is conventionally referred to as a nozzle port. Formed in and extending axially through the nozzle port 20 is a passage 21 which establishes communication between the chamber 18 and a fuel supply line 22 which leads to the burner nozzle 11. The upstream end of the passage 21 normally is closed by a primary regulating valve 23 which is slidably received in the chamber 18. A coil spring 24 in the chamber acts against one end of the valve and urges a disc 25 on the other end thereof against the upstream end of the nozzle port 20 to close the passage 21 and thereby cut off the flow of oil between the chamber and the passage. When the pump 12 is started up, pressure builds up in the chamber and acts against the regulating valve to move the latter to the right against the action of the spring. Fuel oil then flows from the chamber to the nozzle 11 via the passage 21 and the supply line 22. When the pump shuts down, the spring restores the valve to its closed position.

Located in the line 22 closely adjacent the nozzle 11 is a check valve 27 having a passage 28 normally closed by a ball 29 which is urged to its closed position by a spring 30. When the supply line is pressurized by fuel supplied from the pump 12, the ball 27 pops open to allow the fuel to flow to the nozzle. Simply by way of example, the ball may open when the pressure in the line 22 reaches 60 p.s.i. When the pump shuts down and the valve 23 closes, the ball 29 is closed by the spring 30 in order to prevent oil in the line from dripping through the nozzle and building up a coating thereon or on the burner head.

In some cases, an electrically energized preheater 31 is associated with the supply line 22. The preheater increases the temperature of the fuel oil before the oil reaches the nozzle 11 and thereby promotes better combustion of the oil.

When the pump 12 shuts down and the valves 23 and 27 close, oil trapped in the supply line may increase significantly in temperature either due to the preheater 22, if provided, or due to heat soak back from the main burner itself. As the trapped oil increases in temperature, its pressure may rise to a magnitude sufficient to pop the check valve 27 open and permit dripping of the oil through the nozzle 11. To prevent opening of the check valve 27 when the regulating valve 23 is closed, provision is made to relieve the pressure in the supply line 22.

In accordance with the present invention, pressure in the supply line 22 is relieved by means of an extremely simply and low cost pressure relief valve 40 which is compactly built into the nozzle port 20 itself. Because of its construction and location, the relief valve may be incorporated into the nozzle port with virtually no increase in size of the nozzle port or the chamber 18.

Figure 3:
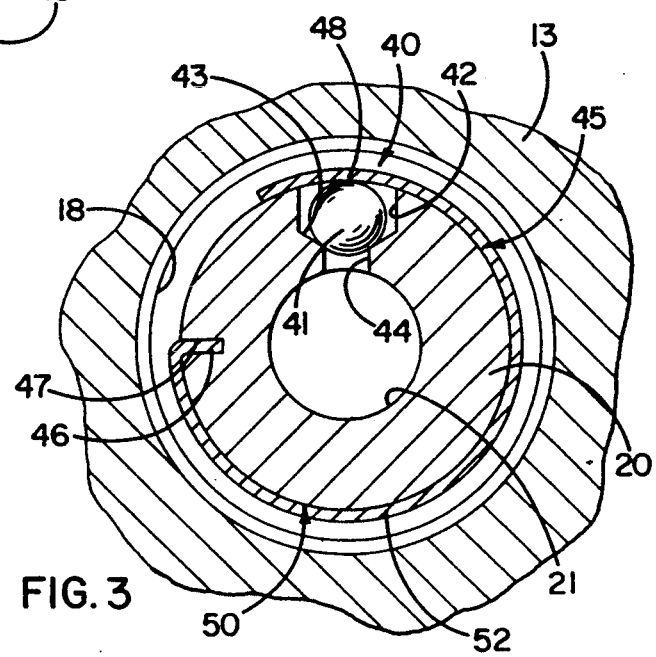
FIG. 3 is an enlarged fragmentary cross-section taken substantially along the line 3—3 of FIG. 2.
Figure 4:
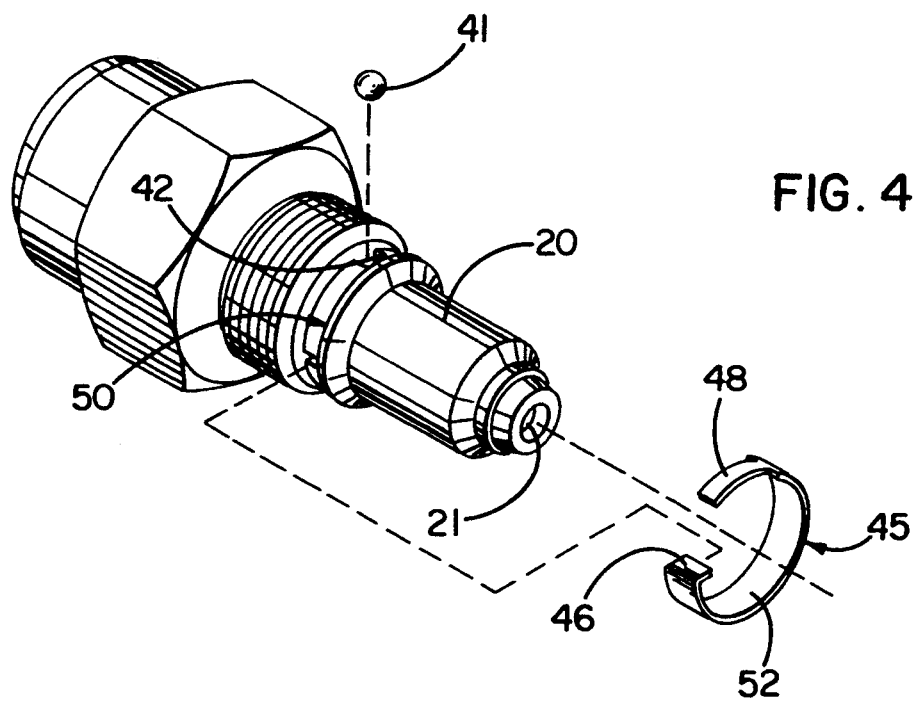
FIG. 4 is an exploded perspective view of the nozzle port and the relief valve.

More specifically, the relief valve 40 comprises a spherical ball 41 which is located in the nozzle port 20 about midway between the ends thereof. The ball 41 is disposed within a drilled hole 42 (FIG. 3) formed in the nozzle port and having a frustoconical end 43 which defines a seat for the ball. A hole 44 of smaller diameter is located between the seat 43 and the axial passage 21 in the nozzle port and defines a radially extending passage which establishes communication between the passage 21 and the chamber 18 when the ball 41 is popped away from the seat 43.

Pursuant to the invention, the ball 41 is urged to a normally closed position against the seat 43 by a leaf spring 45 which compactly wraps around the nozzle port 20. Herein, the leaf spring is in the form of a strip of spring steel which is bent into an arcuate configuration and which extends approximately 300 degrees around the nozzle port 20. One end portion of the spring is defined by a radially extending tang 46 (FIG. 3) which fits into a slot 47 in the nozzle port to secure the spring to the nozzle port in a circumferential direction. The other end portion 48 of the spring defines a cantilever which overlies the ball 41 and forces the latter toward a closed position against the seat 43. When the pressure in the passage 21 exceeds the force exerted on the ball, the cantilevered portion flexes to enable the ball to pop open and establish communication between the passage 21 and the chamber 18 via the passage 44 and the hole 42.

Figure 5:
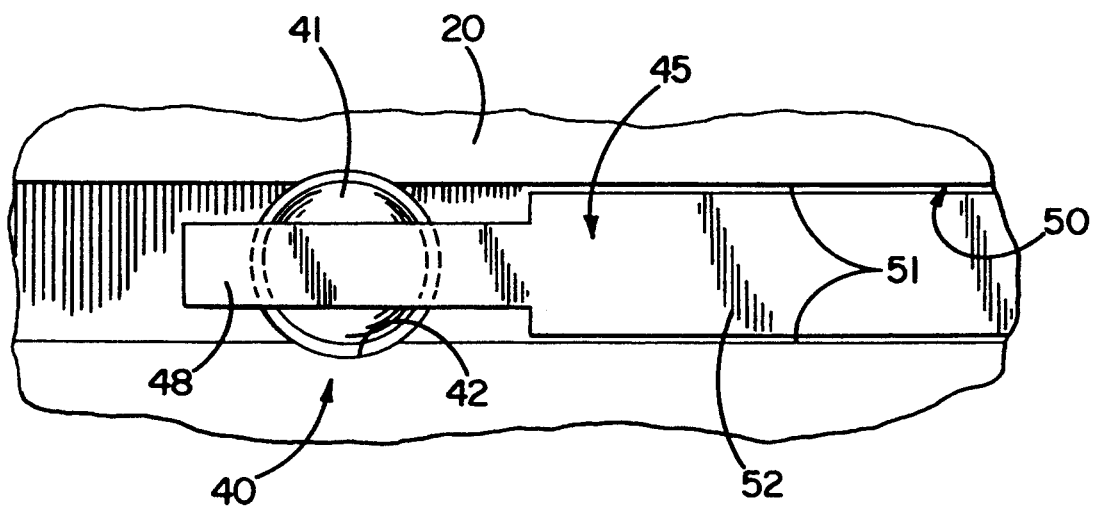
FIG. 5 is a fragmentary rolled out view of certain components shown in FIG. 4.

Advantageously, the spring 45 fits within and is contracted around a circumferentially extending groove 50 (FIG. 5) formed around the nozzle port 20 and having axially spaced side walls 51. As shown most clearly in FIG. 5, the major length or main portion 52 of the spring is formed with an axial width which is just slightly less than the axial spacing between the walls 51 of the groove 50. Thus, the groove retains the spring axially on the nozzle port 20. The cantilevered portion 48 of the spring, however, has an axial width substantially less than the axial spacing between the walls 51 so as to avoid frictional engagement of the cantilevered portion with the walls when the cantilevered portion flexes during opening and closing of the ball 41.

With the foregoing arrangement, the pressure in the chamber 18 coacts with the spring 45 to hold the ball 41 of the relief valve 40 closed as long as the pump 12 is operating and is delivering fuel to the supply line 22 and the burner nozzle 11. Upon shut down of the pump, the valves 23 and 27 close as explained above. If the pressure in the supply line subsequently rises to a predetermined pressure (e.g., 45 p.s.i.), the cantilevered portion 48 of the spring 45 yields and flexes relative to the main portion 52 thereof to allow the ball 41 to open the passage 44 and to bleed fuel oil from the passage 21 and into the chamber 18 via the passage 44 and the hole 42 and thereby relieve the pressure in the line 22. It will be noted that the ball 41 of the relief valve 40 opens at a pressure somewhat lower than required to open the ball 29 of the check valve 27 and thus pressure in the supply line is relieved before oil can flow past the check valve and drip out of the nozzle 11.

By virtue of the leaf spring 45, the relief valve 40 may be fully assembled with the nozzle port 20 before the latter is threaded into the pump body 13. Neither the axial dimension nor the radial dimension of the nozzle port 20 is increased. In addition, the cost of the relief valve formed by the simple ball 41 and spring 45 is relatively low.

We claim:

1. Apparatus for controlling the flow of fuel oil between a fuel pump and a fuel burner nozzle, said apparatus comprising a member having a chamber for receiving pressurized fuel oil from said pump, a body located in said chamber, said body having an internal passage establishing communication between said chamber and said burner nozzle interiorly of said body, said internal passage having an end communicating with said chamber, said body having a second passage establishing communication between said internal passage and said chamber downstream of said end, a primary valve member movable within said chamber between open and closed positions with respect to said end of said internal passage but not with respect to said second passage, said primary valve member cutting off communication between said chamber and said internal passage with respect to said end when said primary valve member is in said closed position, and a relief valve normally closing said second passage and operable to open said second passage automatically when said primary valve member is in said closed position and pressure in said internal passage rises to a predetermined magnitude whereby fuel oil in said internal passage may bleed into said chamber by way of said second passage.

2. Apparatus as defined in claim 1 in which said relief valve comprises a ball, and a spring normally urging said ball to a closed position relative to said second passage, said spring yielding when said pressure rises to said predetermined magnitude and allowing said ball to open said second passage.

3. Apparatus as defined in claim 2 in which said spring is a generally arcuate leaf spring extending at least partially around said body and having first and second end portions, the first end portion of said spring being fixed to said body, the second end portion of said spring defining a cantilever disposed in engagement with said ball and urging said ball toward its closed position with respect to said second passage.

4. Apparatus for controlling the flow of fuel oil between a fuel pump and a fuel burner nozzle, said apparatus comprising a member having a chamber for receiving pressurized fuel oil from said pump, a body located in said chamber and having an internal passage establishing communication between said chamber and said burner nozzle interiorly of said body, a primary valve member movable between open and closed positions with respect to said passage, said primary valve member cutting off communication between said chamber and said passage when said primary valve member is in said closed position, a second passage in said body downstream of said primary valve member and establishing communication between said internal passage and said chamber, a relief valve comprising a ball movable between open and closed positions relative to said second passage, a generally arcuate leaf spring normally urging said ball to its closed position and yielding to allow said ball to move to its open position when said primary valve member is in its closed position and the pressure in said internal passage rises to a predetermined magnitude whereby fuel oil in said internal passage may bleed into said chamber by way of said second passage, said spring extending at least partially around said body and having first and second end portions, the first end portion of said spring being fixed to said body, and the second end portion of said spring defining a cantilever disposed in engagement with said ball and urging said ball to its closed position with respect to said second passage.

5. Apparatus as defined in claim 4 further including a groove formed at least partially around said body and receiving said spring, said groove being of predetermined axial width and being defined in part by axially opposing walls, said spring having a main portion located between said first and second end portions with the axial width of said main portion being just somewhat less than the width of said groove whereby the walls of said groove hold said spring in a substantially axially fixed position on said body, and the second end portion of said spring having an axial width less than the axial width of the main portion of said spring whereby the second end portion of said spring is free to flex without frictionally engaging the walls of said groove.

6. Apparatus as defined in claim 5 in which said second end portion of said spring comprises a radially projecting tang, said body having a slot located adjacent said groove and receiving said tang to fix said tang to said body.

* * * * *